United States Patent [19]
Nyui

[11] Patent Number: 5,369,271
[45] Date of Patent: Nov. 29, 1994

[54] ROTATION DETECTOR USING DUAL POSITION INTERFERENCE LIGHT

[75] Inventor: Masaru Nyui, Tokyo, Japan

[73] Assignee: Canon Kabushiki Kaisha, Tokyo, Japan

[21] Appl. No.: 202,685

[22] Filed: Feb. 25, 1994

Related U.S. Application Data

[63] Continuation of Ser. No. 28,137, Mar. 9, 1993, abandoned.

Foreign Application Priority Data

Mar. 13, 1992 [JP] Japan .................. 4-089761

[51] Int. Cl.$^5$ ............................ G01D 5/34
[52] U.S. Cl. ................ 250/231.16; 250/237 G
[58] Field of Search ........ 250/231.16, 237 G; 356/354, 356, 358, 374; 33/707; 341/11, 13

[56] References Cited

U.S. PATENT DOCUMENTS

| | | | |
|---|---|---|---|
| 3,756,723 | 9/1973 | Hock | 356/110 |
| 3,770,970 | 11/1973 | Trump | 250/231 |
| 4,172,994 | 10/1979 | Bergkvist | 324/175 |
| 4,433,585 | 2/1984 | Levine | 73/862.34 |
| 4,792,678 | 12/1988 | Spies | 250/231 |
| 4,819,051 | 4/1989 | Jacobson | 341/13 |
| 4,820,918 | 4/1989 | Igaki et al. | 250/231 |
| 4,987,299 | 1/1991 | Kobayashi et al. | 250/231.14 |
| 4,988,864 | 1/1991 | Michel et al. | 250/231.16 |
| 5,036,192 | 7/1991 | Ishizuka et al. | 250/231.16 |
| 5,173,601 | 12/1992 | Franz | 250/231.16 |

FOREIGN PATENT DOCUMENTS

| | | |
|---|---|---|
| 0262349 | 4/1988 | European Pat. Off. . |
| 0297482 | 1/1989 | European Pat. Off. . |
| 41336 | 12/1979 | Japan . |
| 10716 | 1/1986 | Japan . |
| 81212 | 4/1988 | Japan . |
| 176914 | 7/1989 | Japan . |
| 197818 | 8/1991 | Japan . |
| 1247975 | 9/1971 | United Kingdom . |

Primary Examiner—David C. Nelms
Assistant Examiner—K. Shami
Attorney, Agent, or Firm—Fitzpatrick, Cella, Harper & Scinto

[57] ABSTRACT

In a rotation detector, a light beam from a light irradiating device is projected onto a first scale of an optical scale comprising gratings having a constant period provided around a cylindrical member of a rotating member, the light beam modulated by the first scale is projected onto a second scale of the optical scale via a region away from the center of the rotation shaft of the rotating member, the light beams as a result of modulation by the second scale are sensed by a light sensing device, and information regarding the rotation of the rotating member is detected using signals from the light sensing device.

42 Claims, 12 Drawing Sheets

FIG.14
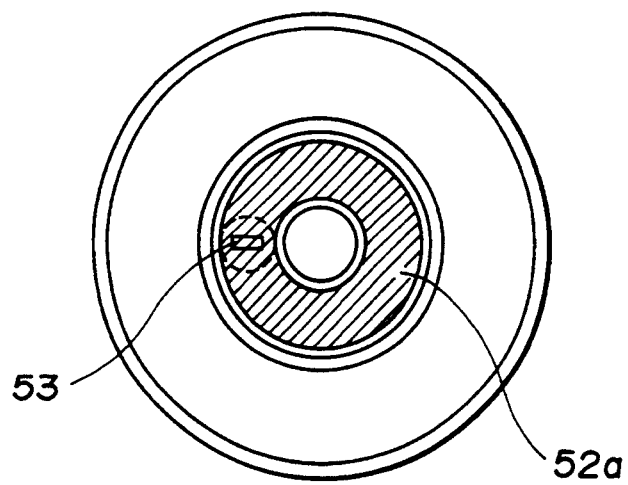
FIG.15(A)     FIG.15(B)
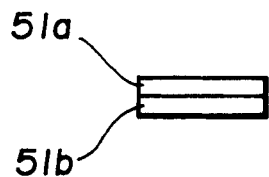 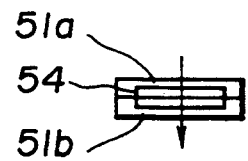

ROTATION DETECTOR USING DUAL POSITION INTERFERENCE LIGHT

This application is a continuation-in-part continuation, of application Ser. No. 08/028,137 filed Mar. 9, 1993, now abandoned.

BACKGROUND OF THE INVENTION

1. Field of the Invention

This invention relates to a rotation detector. In particular, the present invention can be favorably applied to a rotary encoder which detects information on the rotation of a rotating member having an optical scale including transparent gratings obtained by providing, for example, a plurality of projections and recesses periodically on, or on a portion of, the outer circumferential surface or the inner circumferential surface of a cylindrical member by projecting a light beam onto the rotating member and utilizing light beams emanating from the optical scale.

2. Description of the Related Art

Photoelectric rotary encoders have been utilized as means for detecting the rotational speed or the amount of variations in the rotational speed of a rotating mechanism, such as a capstan motor, a rotating drum or the like, used in a computer unit, such as a floppy-disk drive or the like, a business machine, such as a printer or the like, an NC (numerical control) machine tool, a VCR (video cassette recorder) or the like.

FIGS. 1 and 2 are a cross-sectional view and a plan view of a principal portion of a rotary encoder which utilizes so-called Talbot's interference, respectively, proposed in, for example, Japanese Patent Laid-open Application (Kokai) No. 3-197818 (1991). In addition, encoders which utilize Talbot's interference proposed in Japanese Patent Laid-open Application (Kokai) Nos. 61-10716 (1986) and 1-176914 (1989) are known.

In FIGS. 1 and 2, semiconductor laser 1 emits a coherent light beam having a wavelength $\lambda$. Collimating lens system 2 converts the divergent light beam from semiconductor laser 1 into a parallel light beam. Semiconductor laser 1 and collimating lens system 2 constitute light irradiating means LR. Optical scale 3 includes transparent grating portions obtained by providing a plurality of V-grooves periodically on the inner circumferential surface of cylindrical member 3c, and rotates in the direction of the arrow around rotation shaft 6a.

Optical scale 3 is made of a transparent optical material, and constitutes a portion of rotating member 6. Three photodetectors 4a, 4b and 4c (FIG. 2) constituting light sensing means 4 are disposed at positions facing light irradiating means LR across optical scale 3. The output of each photodetector is connected to signal processing circuit 5. Signal processing circuit 5 includes pulse counting circuitry, circuitry for determining the direction of the rotation of optical scale 3, circuitry for signal interpolation processing, and the like.

The rotatry encoder shown in FIGS. 1 and 2 performs light modulation (deflection) by projecting the light beam from light irradiating means LR onto first scale 3a in one region of optical scale 3, and projecting the light beam modulated (diffracted) by optical scale 3b onto second scale 3b on another region of optical scale 3. A plurality of (three) light beams emanated from second scale 3b of optical scale 3 are sensed by light sensing means 4. Information regarding the rotation of optical scale 3 is detected utilizing output signals from light sensing means 4.

SUMMARY OF THE INVENTION

It is an object of the present invention to provide a rotation detector whose main body can be mounted at an arbitrary position with respect to its rotation shaft so that light beams do not pass through the center of the rotation shaft, while the size of the entire device is reduced.

According to one aspect, the embodiments described below, which achieve the above-described objective relate to a device in which a light beam from light irradiating means is projected onto a first scale of an optical scale comprising gratings having a constant period provided on a portion of a cylindrical member of a rotating member, the light beam modulated by the first scale is projected onto a second scale of the optical scale, the light beam modulated by the second scale is sensed by light sensing means, and information regarding the rotation of the rotating member is detected using a signal from the light sensing means. The light irradiating means is disposed so that its optical axis is in the direction of the rotation shaft of the rotating member. The light beam from the light irradiating means is projected onto the optical scale while deflecting the light beam in a direction perpendicular to the rotation shaft by light guiding means.

The light guiding means projects the light beam modulated by the first scale onto the second scale.

According to another aspect, the embodiments described below, which achieve the above-described objective relate to a device in which a light beam from light irradiating means is projected onto a first scale of an optical scale comprising gratings having a constant period provided around a cylindrical member of a rotating member, the light beam modulated by the first scale is projected onto a second scale of the optical scale via a region away from the center of the rotation shaft of the rotating member, light beams as a result of modulation by the second scale are sensed by light sensing means, and information regarding the rotation of the rotating member is detected using signals from the light sensing means.

In particular, light guiding means is disposed in the optical path from the first scale to the second scale so that the direction of movement of an interference image formed by the light beam diffracted by the first scale caused by the rotation of the rotating member is reverse to the direction of movement of the second scale. Respective units are arranged so that the following relationship holds:

$$(N-1/5)P^2/\lambda \leq L \leq (N+1/5)P^2/\lambda,$$

where L is the optical length from the first scale to the second scale converted to a value in air, P is the pitch of the gratings of the optical scale, $\lambda$ is the wavelength of the light beam from the light irradiating means, and N is a natural number. The gratings of the optical scale are transparent, and have projections and recesses having inclined surfaces so as to modulate an incident light beam along the circumferential direction of the cylindrical member.

According to still another aspect, the embodiments described below, which achieve the above-described objective relate to a device in which a rotating member includes a first optical scale and a second optical scale, each comprising a grating having a constant period, provided around a first cylindrical member and a second cylindrical member whose diameter is different from the diameter of the first cylindrical member, respectively, a light beam from light irradiating means is projected onto the first optical scale, the light beam modulated by the first optical scale is projected onto the second optical scale after passing through a region away from the center of the rotation shaft of the rotating member via an optical member, light beams as a result of modulation by the second optical scale are sensed by light sensing means, and information regarding the rotation of the rotating member is detected using signals from the light sensing means.

In particular, if the optical path from the first optical scale to the second optical scale converted to a value in air is represented by L, the pitches of the first and second optical scales are represented by $P_1$ and $P_2$, respectively, the wavelength of the light beam from the light irradiating means is represented by $\lambda$, N represents a natural number, the radii of the first and second optical scales are represented by $d_1$ and $d_2$, respectively, the number of the gratings of the first optical scale is represented by n, the focal length of the optical member is represented by f, the magnification of the projection by the optical member is represented by $\beta$, respective units are arranged so as to satisfy the following conditions:

$(N-1/5)P_1^2/\lambda \leq L \leq (N+1/5)P_1^2/\lambda$, $2d_2 \cdot \pi = n \cdot P_2$, $d_1 \cdot \beta = d_2$, $P_1 \cdot \beta = P_2$, $f = (d_2 - d_1) \cdot \beta/(1+\beta)^2$.

The gratings of the first and second optical scales are transparent, and have projections and recesses having inclined surfaces for modulating an incident light beam along the circumference of the first and second cylindrical members.

According to one aspect, the present invention relates to a device for detecting relative rotation between first and second members, one of which is rotated about an axis of rotation relative to the other. The device includes one or two scales fixed relative to the first member and being provided along the direction of relative rotation between the first and second members, a light source provided on the second member for generating light beams, a detection system provided on the second member for receiving at least one of the light beams emitted from the light source and passing through the one or two scales, to detect the relative rotation between the first and second members, and a light guiding system. When one scale is utilized, the light guiding system projects the light beams from the light source onto a first position of the scale, and forms and projects a Fourier image of the first position onto a second position of the scale using interference between at least first-order diffracted light and 0-order light generated from the first position. When two scales are utilized, the light guiding system projects the light beams from the light source onto a first position of one of the scales, and forms and projects a Fourier image of the first position onto a second position of one of the scales using interference between at least first-order diffracted light and 0-order light generated from the first position. In either case, the light beams from the second position are sensed by the detection system, and the light guiding system is disposed so that the optical path from the first position to the second position for forming the Fourier image does not include the axis of relative rotation between the axis of relative rotation between the first and second members.

According to another aspect, the present invention relates to a device for detecting a relative rotation between first and second members, one of which is rotated about an axis of rotation relative to the other, using one or two scales fixed relative to the first member and provided along the direction of the relative rotation between the first and second members. The device includes a light source provided on the second member for generating light beams, a detection system provided on the second member for receiving at least one of the light beams emitted from the light source and passing through the scale, to detect the relative rotation between the first and second members and a light guiding system. When one scale is utilized, the light guiding system projects the light beams from the light source onto a first position of the scale, and forms and projects a Fourier image of the first position onto a second position of the scale using interference between at least first-order diffracted light and 0-order light generated from the first position. When two scales are utilized, the light guiding system projects the light beams from the light source onto a first position of one of the scales, and forms and projects a Fourier image of the first position onto a second position of one of the scales using interference between at least first-order diffracted light and 0-order light generated from the first position. In both cases, light beams from the second position are sensed by the detection system, and the light guiding system is disposed so that the optical path from the first position to the second position for forming Fourier image does not include the axis of relative rotation between the first and second members.

According to yet another aspect, the present invention relates to a driving system for relatively rotating first and second members. The system includes one or two scales fixed relative to the first member and being provided along the direction of relative rotation between the first and second members, a light source provided on the second member for generating light beams, a detection system provided on the second member for receiving at least one of the light beams emitted from the light source and passing through the scale, to detect the relative rotation between the first and second members and for generating a detection output, a light guiding system, a driving unit for relatively rotating the first and second members and a control system for controlling the driving unit in accordance with the detection output by the detection system. When one scale is utilized, the light guiding system projects the light beams from the light source onto a first position of the scale, and forms and projects a Fourier image of the first position onto a second position of the scale using interference between at least first-order diffracted light and 0-order light generated from the first position. When two scales are utilized, the light guiding system projects the light beams from the light source onto a first position of one of the scales, and forms and projects a Fourier image of the first position onto a second position of one of the scales using interference between at least first-order diffracted light and 0-order light generated from the first position. In either case, light beams from the second position are sensed by the detection system, and the light guiding system is disposed so taht the optical path from the first position to the second position for forming the Fourier image does not include the axis of relative rotation between the first and second members.

The foregoing and other objects, advantages and features of the present invention will become more apparent from the following description of the preferred embodiments taken in conjunction with the accompanying drawings.

BRIEF DESCRIPTION OF THE DRAWINGS

FIG. 14 is an enlarged view illustrating a part of the device shown in FIG. 13;

FIGS. 15(A) and 15(B) are enlarged views illustrating a part of the device shown in FIG. 13;

DESCRIPTION OF THE PREFERRED EMBODIMENTS

Preferred embodiments of the present invention will now be described with reference to the drawings.

Figure 1:
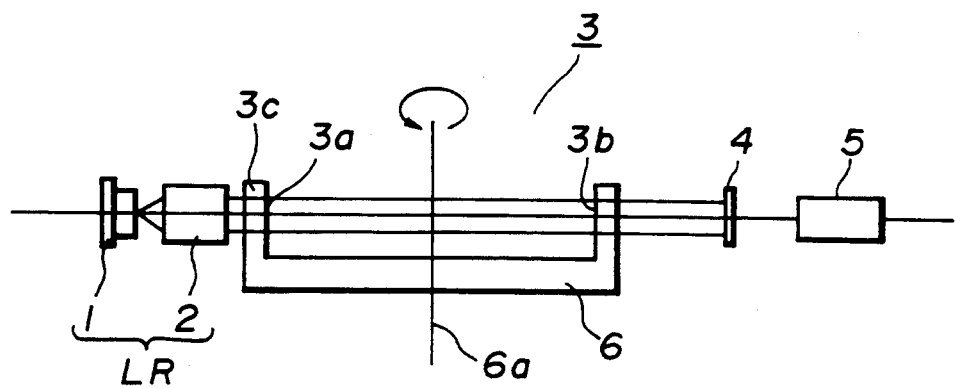
FIG. 1 is a cross-sectional view of a principal part of a conventional rotary encoder.
Figure 2:
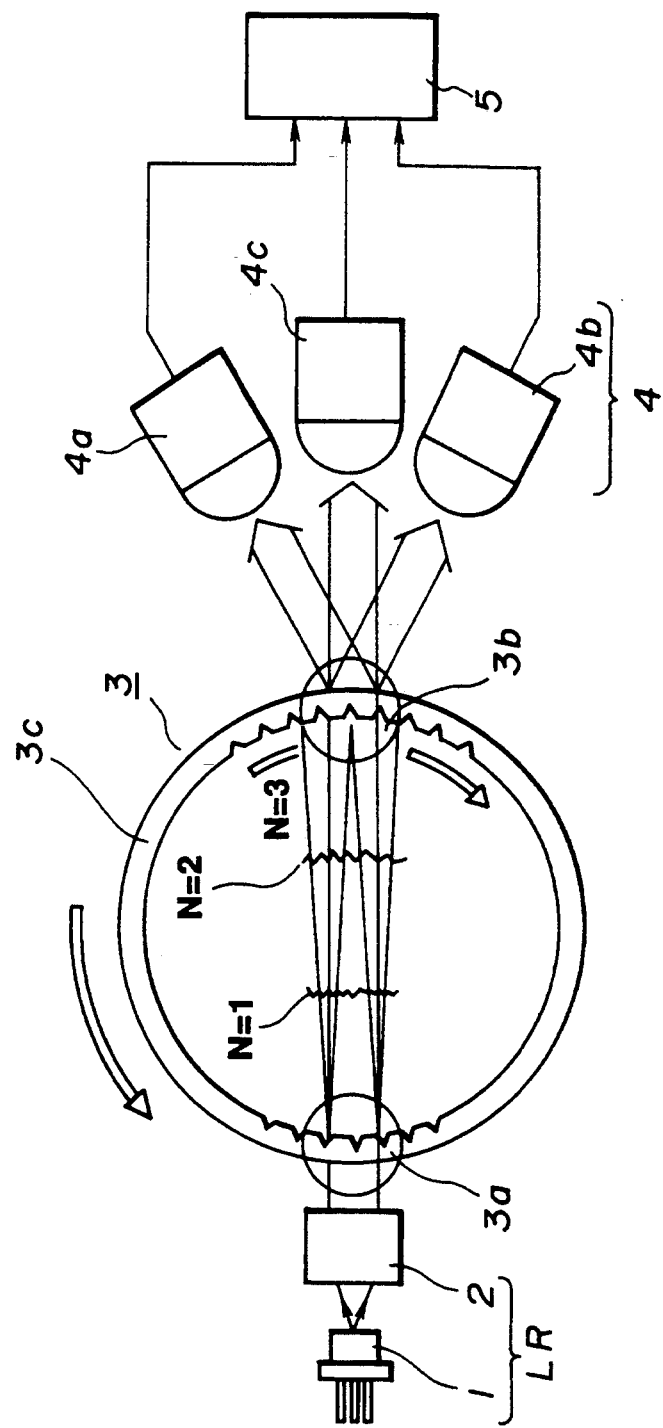
FIG. 2 is a plan view of the principal part of the conventional rotary encoder.
Figure 3:
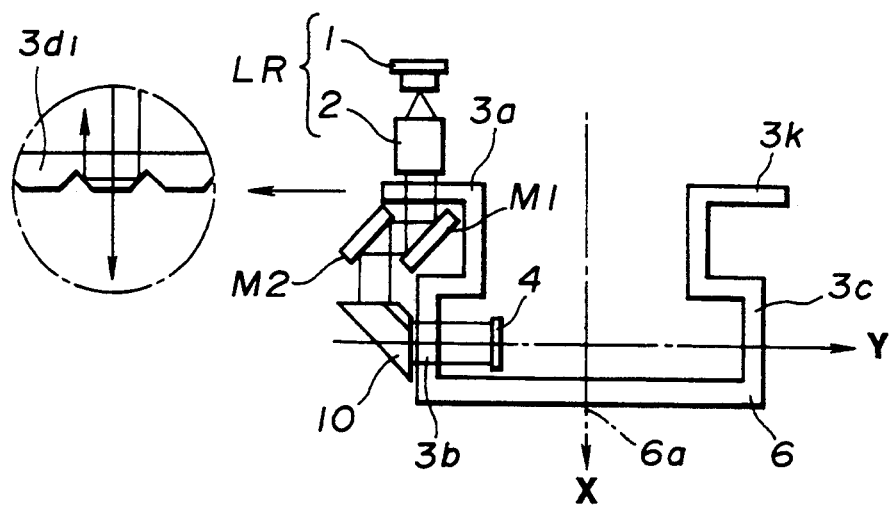
FIG. 3 is a cross-sectional view of a principal part of a device according to a first embodiment of the present invention.
Figure 4:
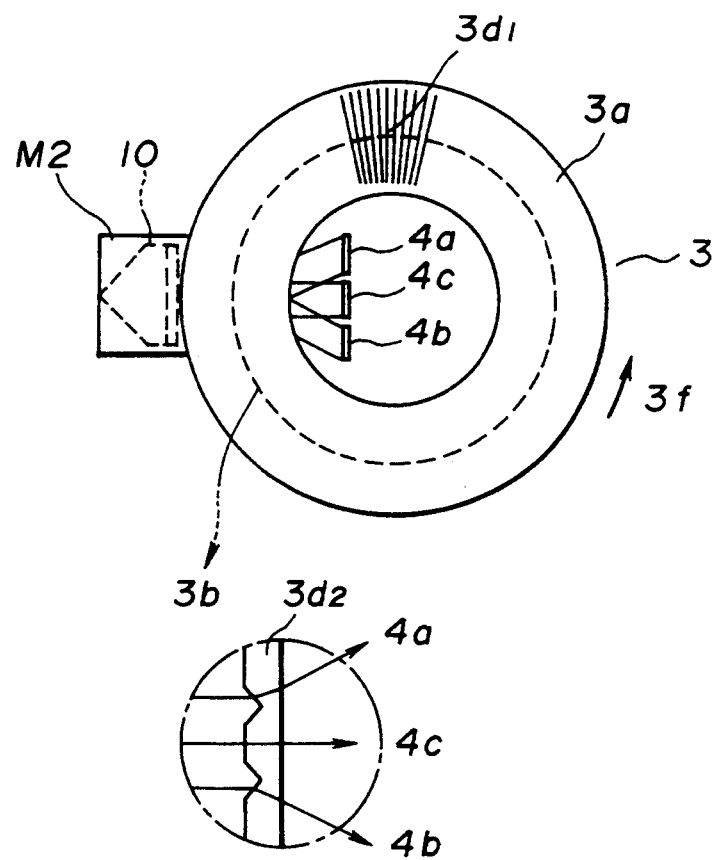
FIG. 4 is a plan view of the principal part of the device of the first embodiment.

FIG. 3 is a cross-sectional view of a principal part of a device according to a first embodiment of the present invention. FIG. 4 is a plan view of the principal part of the device shown in FIG. 3.

In FIGS. 3 and 4, light irradiating means LR includes semiconductor laser 1 and collimating lens 2. The optical axis of light irradiating means LR is arranged to be parallel to rotation axis $6a$ of rotating member 6 (to be described later). Optical scale 3 includes first optical scale $3a$ comprising a grating (grating portion) $3d_1$ having a plurality of V-grooves provided radially on the circumference of disk $3k$ with a constant period, and second optical scale $3b$ comprising grating $3d_2$ having a plurality of V-grooves provided radially on the inner circumferential surface or the outer circumferential surface of cylindrical member $3c$ with a constant period. The radius of the circle depicted by the centers of the incident positions of light beams emanated from first scale $3a$ and the radius of the second scale $3b$ are designed to be equal.

Figure 5A:
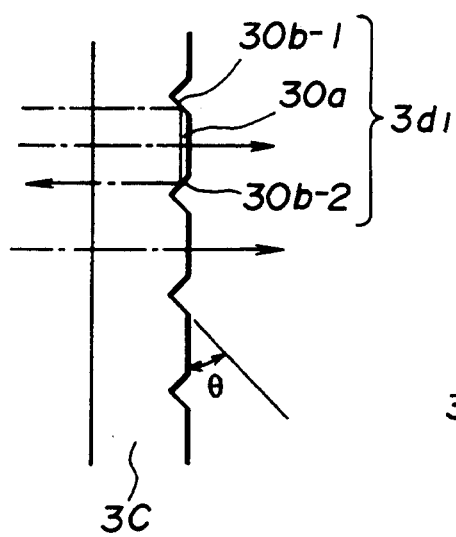
FIGS. 5(A) and 5(B) are diagrams illustrating gratings shown in FIG. 3.
Figure 5B:
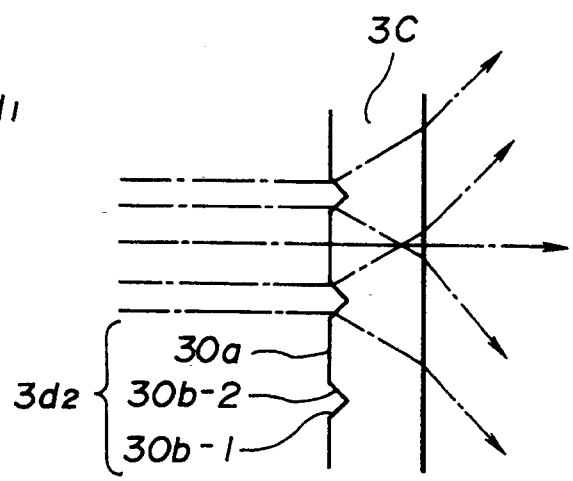

In the present embodiment, the combined body of disk $3k$ and cylindrical member $3c$ is termed cylindrical member 3C (see FIGS. 5(A) and 5(B)). Optical scale 3 is made of a transparent optical material, and is provided as a part of rotating member 6. Optical scale 3 rotates around rotation shaft $6a$ as one body with rotating member 6.

As shown in FIG. 3, grating $3d_1$ comprises V-grooves (V-groove portions), each having two slopes inclined in reverse directions, provided radially around rotation shaft $6a$. As shown in FIG. 4, grating $3d_2$ comprises V-grooves (V-groove portions), each having two slopes inclined in reverse directions, which extend in a direction perpendicular to the direction of the rotation of optical scale 3 indicated by arrow $3f$ (the direction of rotation shaft $6a$), and curved portions (hereinafter termed "plane portions"), each of which is substantially close to a plane having a slight cylindrical curvature. In the present embodiment, gratings $3d_1$ and $3d_2$ have the same pitch.

Next, a description will be provided of the optical function of gratings $3d_1$ and $3d_2$. FIGS. 5(A) and 5(B) are diagrams illustrating the optical paths of light beams indicent upon gratings $3d_1$ and $3d_2$ (hereinafter termed "gratings $3d$").

As shown in FIGS. 5(A) and 5(B), gratings $3d$ form gratings by alternately arranging V-groove portions $30b$-1, $30b$-2 and plane portion $30a$. A number n V-grooves are arranged on a part of cylindrical member 3C in the circumferential direction with an equal interval, i.e., pitch P. Each V-groove has a width of $\frac{1}{2}$·P, and each plane portion has a width of $\frac{1}{2}$·P. Each slope of the V-groove is inclined by at least a critical angle, angle $\theta=45°$ in the present embodiment, with respect to a straight line connecting the base and the center of the V-groove.

Referring again to FIGS. 3 and 4, there are shown mirrors M1 and M2. Light guiding means 10 comprises a roof prism. Light guiding means 10 reflects the light beam modulated (diffracted) by first optical scale $3a$ in a direction orthogonal to rotation shaft $6a$, and guides the reflected light beam to second optical scale $3b$, so that interference fringes due to the diffraction of the light beam by first optical scale $3a$ are formed immediately before second optical scale $3b$ and rotate in a direction reverse to the direction of rotation of first optical scale $3a$ in accordance with the rotation of first optical scale $3a$.

In the present embodiment, the distance L between first scale (first region) $3a$ and second scale (second region) $3b$ of optical scale 3 is arranged to satisfy the following expression:

$$L = N \cdot P^2 / \lambda,$$

where
p is the pitch of the grating (in first scale 3a, the pitch at the center of the incident position of the light beam equals P), λ is the wavelength of the light beam, and N is a natural number.

L also may satisfy the following expression in place of the above-described expression, in a second embodiment:

$$(N-1/5)P^2/\lambda \leq L \leq (N+1/5)P^2/\lambda.$$

By thus configuring optical scale 3, the image of the grating of first region 3a of optical scale 3 is projected onto the grating of second region 3b. The projected image of the grating is called a Fourier image, which is produced by the self imaging function of the grating due to the phenomenon of light diffraction.

Next, a description will be provided of the method of detecting information regarding the rotation of optical scale 3 (rotating member 6) in the present embodiment.

The light beam from semiconductor laser 1 is projected onto first scale (first region) 3a of optical scale 3 by adjusting the position of collimating lens system 2. As shown in FIG. 5(A), this light beam passes through grating $3d_1$ of first region 3a at grating element 30a. The light beam is subjected to total reflection at the surface of grating element 30b-1, and travels toward the surface of grating element 30b-2, since the slope is set at an angle equal to at least the critical angle. Thereafter, the light beam is also subjected to total reflection at the surface of grating element 30b-2. As a result, the light beam which has reached the surface of grating element 30b-1 does not enter optical scale 3, but is returned substantially toward the incident direction. In the same manner, the light beam which has reached the surface of grating element 30b-2 is returned toward the incident direction after being repeatedly subjected to total reflection.

Accordingly, the light beams which have reached the range of the two slopes 30b-1 and 30b-2 constituting the V-groove in first region 3a are reflected without entering cylindrical member 3C. Only the light beam which has reached grating element 30a passes through cylindrical member 3C, and travels in the forward direction. That is, in first region 3a, grating $3d_1$ having the V-grooves has the same function as a transparent amplitude diffraction grating.

The light beams are diffracted by grating $3d_1$ of first region 3a, and diffracted light beams of 0-order, ±1st-order, ±2nd-order, . . . are generated. As a result of interference between two or three light beams, i.e., the 0-order and one or two of the 1st-order light beams, a Fourier image of the grating of first region 3a is imaged onto second optical scale 3b of optical scale 3. The Fourier image is repeatedly imaged at positions of integer multiples of a distance L optically after the surface of grating $3d_1$.

In the present embodiment, the values of wavelength λ of the light source and pitch P of the grating, and the position of collimating lens system 2 are determined so that the N-th Fourier image is imaged onto the surface of grating $3d_2$ of second region 3b. The pitch of the light and dark portion of the Fourier image equals the pitch P of the V-grooves of gratings 3d of first region 3a and second region 3b.

As shown in FIG. 5(B), since the light beam incident upon surface 30a of second region 3b is substantially perpendicular to surface 30a, it reaches photosensor 4c (FIG. 4) after passing through surface 30a without being diffracted. Since the light beams incident upon the two slopes 30b-1 and 30b-2 consitituting the V-groove have an incident angle substantially equal to 45°, they are largely diffracted in different directions and reach photosensors 4a and 4b, respectively.

As described above, in second region 3b, the light beams travel in three different directions by three surfaces having different inclinations, i.e., two slopes inclined in different directions with respect to the incident light beams and a plane beween V-grooves, and reach photosensors 4a, 4b and 4c provided at positions corresponding to the respective surfaces. That is, in second region 3b, the V-groove grating functions as an element for dividing light wave surfaces.

When optical scale 3 rotates, the amounts of light detected by photosensors 4a, 4b and 4c change. That is, the balance among the amounts of light incident upon the respective photosensors changes in accordance with a relative displacement between the positions of the grating and the Fourier image. As a result, if optical scale 3 rotates in a counterclockwise direction, changes in the amounts of light caused by the rotation of optical scale 3 as shown in FIG. 6(A) are obtained.

Figure 6A:
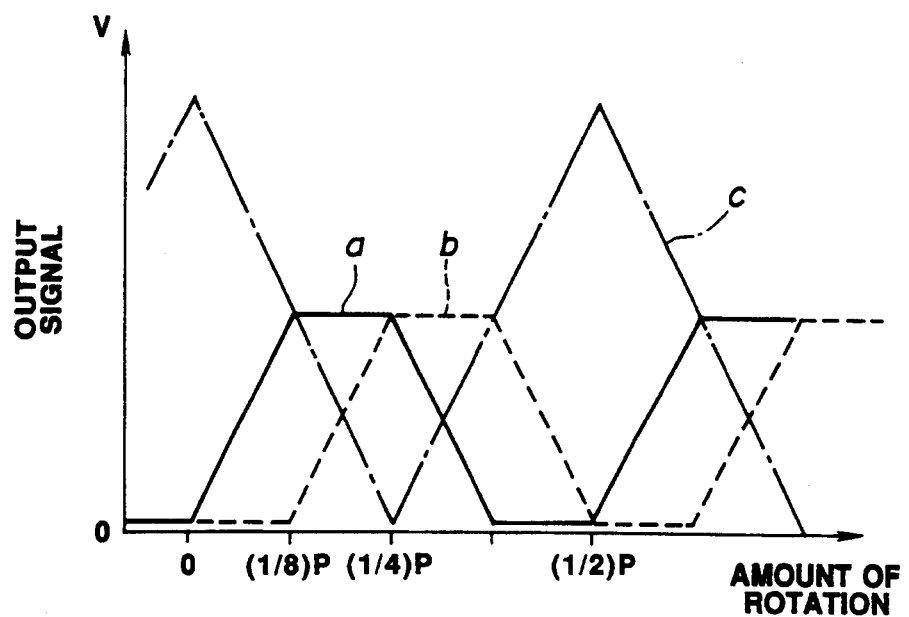
FIGS. 6(A) and 6(B) are diagrams illustrating the waveforms of output signals from light sensing means shown in FIG. 3.

In FIG. 6(A), the abscissa represents the amount of rotation of optical scale 3, and the ordinate represents the amount of received light. Signals "a", "b", and "c" are outputs from photosensors 4a, 4b and 4c, respectively. If optical scale 3 rotates in a clockwise direction, signals "a", "b" and "c" become outputs from photosensors 4b, 4a and 4c, respectively. The direction of the rotation of optical scale 3 can be determined from such a difference.

Figure 6B:
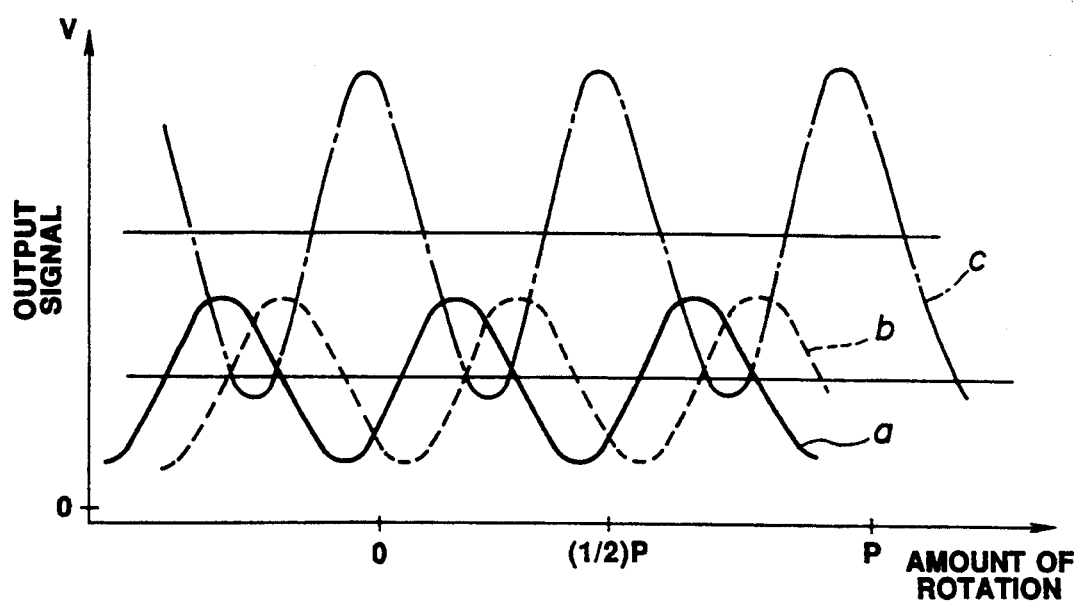

FIG. 6(A) illustrates theoretical changes in the amount of light in an ideal case in which the contrast of the Fourier image is very high. In an actual case, the contrast of the Fourier image is lower than in the ideal case. Hence, the amounts of light change substantially sinusoidally, as shown in FIG. 6(B). Information regarding the rotation of optical scale 3 (rotating member 6), such as the rotational angle, the amount of rotation, the rotational speed, the rotational acceleration and the like, is obtained based on the above-described signals.

Figure 7:
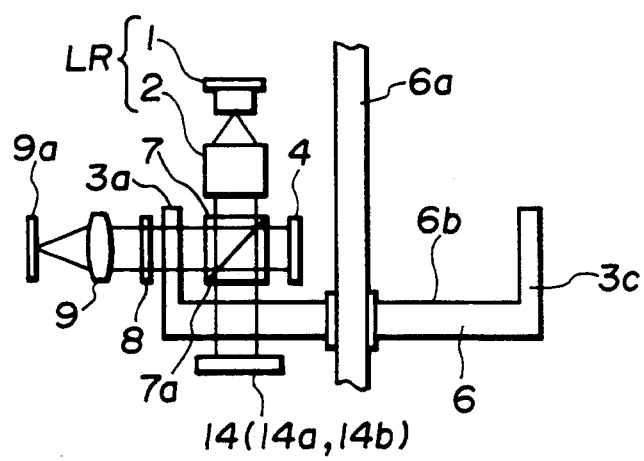
FIG. 7 is a cross-sectional view of a principal part of a device according to a second embodiment of the present invention.
Figure 8:
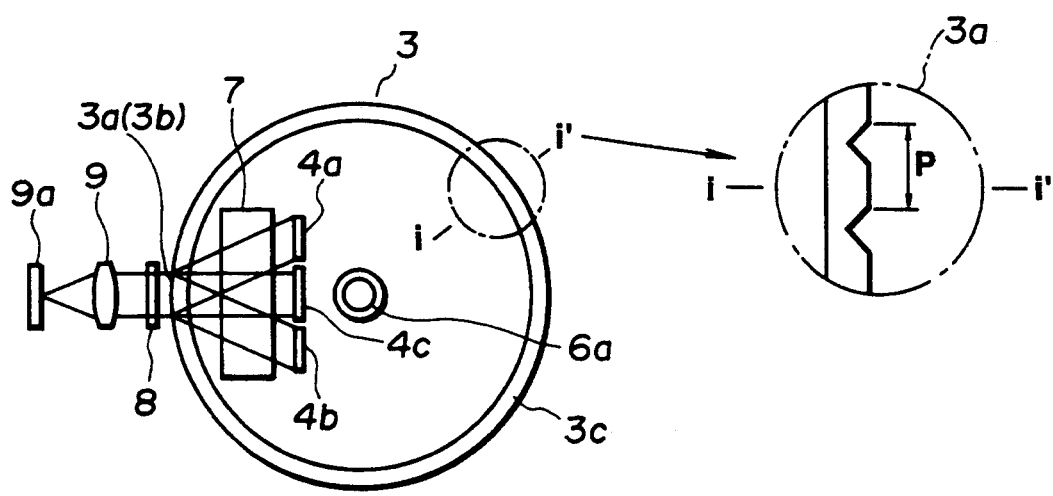
FIG. 8 is a plan view of the principal part of the device of the second embodiment.

FIG. 7 is a cross-sectional view of a principal part of a device according to a second embodiment of the present invention. FIG. 8 is a plan view of the principal part of the device of the second embodiment.

In the present embodiment, optical scale 3 includes first optical scale 3a (second optical scale 3b equals first optical scale 3a) comprising a grating having a plurality of grooves with pitch P provided on the outer circumferential surface of cylindrical member 3C.

Light irradiating means LR comprising light source 1 and collimating lens 2 is disposed so that its optical axis is parallel to rotation shaft 6a of rotating member 6. The light beam from light irradiating means LR is reflected by deflecting member 7 having polarizing beam splitter 7a, and the deflected light beam is projected onto first optical scale 3a of optical scale 3.

Deflecting member 7 deflects, for example, the p-polarized component of the light beam from light irradiating means LR to first optical scale 3a of optical scale 3. The light beams modulated (diffracted) by and passing through first optical scale 3a pass through optical member 9 after passing through ¼-wavelength plate 8, return along the original optical path after being reflected by reflecting surface 9a provided at the focus position of optical member 9, and pass through optical member 9 and ¼-wavelength plate 8. (Optical member 9 is disposed in the state of so-called Fourier transform in which the position of its frontside focus position coincides with the surface of first optical scale 3a taking into consideration the length of the optical path of ¼-wavelength plate 8.)

The direction of movement of the interference image formed by light modulated (diffracted) by first optical scale 3a is reverse to the direction of movement of second optical scale 3a (equal to first optical scale 3a) due to optical member 9 and reflecting surface 9a.

The length L of the optical path from first optical path 3a to second optical path 3b converted to a value in air is arranged to satisfy the following expression:

$$(N-1/5)P^2/\lambda \leq L \leq (N+1/5)P^2/\lambda,$$

where P is the pitch of optical scale 3a (3b), $\lambda$ is the wavelength of the light beam from the light source of light irradiating means LR, and N is an integer.

Since the light beam passes through ¼-wavelength plate 8 twice when travelling in the forward and backward directions, the direction of polarization of the light beam rotates 90°. The above-described interference image obtained by utilizing the principle of Talbot's interference has the same pitch as first optical scale 3a at the position of second optical scale 3b, and the contrast of the image is maintained high.

The three light beams modulated by and passing through second optical scale 3b pass through polarizing beam splitter 7 as the s-polarized components, and are incident upon respective photosensors 4a, 4b and 4c of light sensing means 4. Output signals from light sensing means 4 have a phase difference of 90°, and information regarding the rotation of optical scale 3 provided in rotating member 6 comprises pulses whose number is twice the number of grooves of the grating of optical scale 3 and is output.

According to the above-described configuration, the optical path from first optical scale 3a to second optical scale 3b does not pass through the space around the center of rotation of rotation shaft 6a of rotating member 6 including the cylindrical optical scale 3. Hence, it becomes possible to mount the main body of the rotary encoder at an arbitrary position with respect to rotation shaft 6a. By mounting optical members 8 and 9 and reflecting plane 9a at arbitrary positions with respect to rotation shaft 6a, the influence of eccentricity is reduced.

Moreover, since the length L of the optical path can be made shorter than in the conventional configuration, the optical path can be arranged in a range of a small value of N, where the contrast of the interference image is maintained high. Hence, the present embodiment is advantageous for reducing deterioration of the output signals due to changes in the environment.

Figure 9:
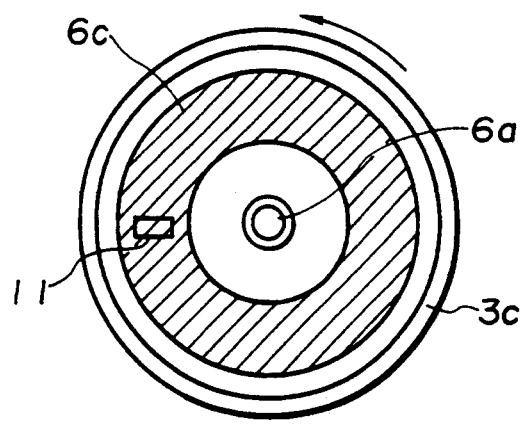
FIG. 9 is an enlarged view illustrating a part of the device shown in FIG. 7.
Figure 10A:
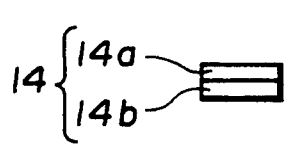
FIGS. 10(A) and 10(B) are enlarged views illustrating a part of the device shown in FIG. 7.
Figure 10B:
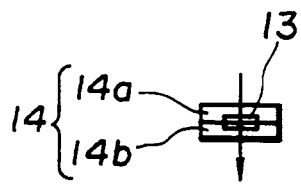

In the present embodiment, as shown in FIGS. 9, 10(A) and 10(B), ringed light-blocking member 6c including a slitlike opening 11 in a portion thereof is provided on a part of surface 6b of rotating member 6, and photosensor 14 (14a and 14b) having two light-sensing surfaces is provided below opening 11. As shown in FIGS. 10(A) and 10(B), by guiding a part (the s-polarized component) of the light beam from light irradiating means LR to slit-like opening 11 via polarizing beam splitter 7, slit-like light beam 13 scans photosensors 14a and 14b in accordance with the direction of the rotation (indicated by the arrow) of rotating member 6. The reference position of rotation when measuring the amount of rotation of rotating member 6 is determined from the difference between output signals from the two photosensors 14a and 14b.

Figure 11:
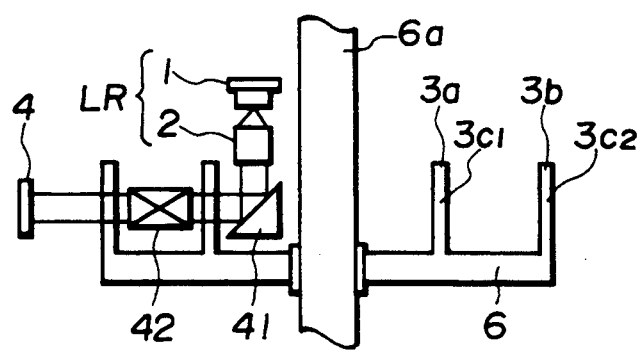
FIG. 11 is a cross-sectional view of a principal part of a device according to a third embodiment of the present invention.
Figure 12:
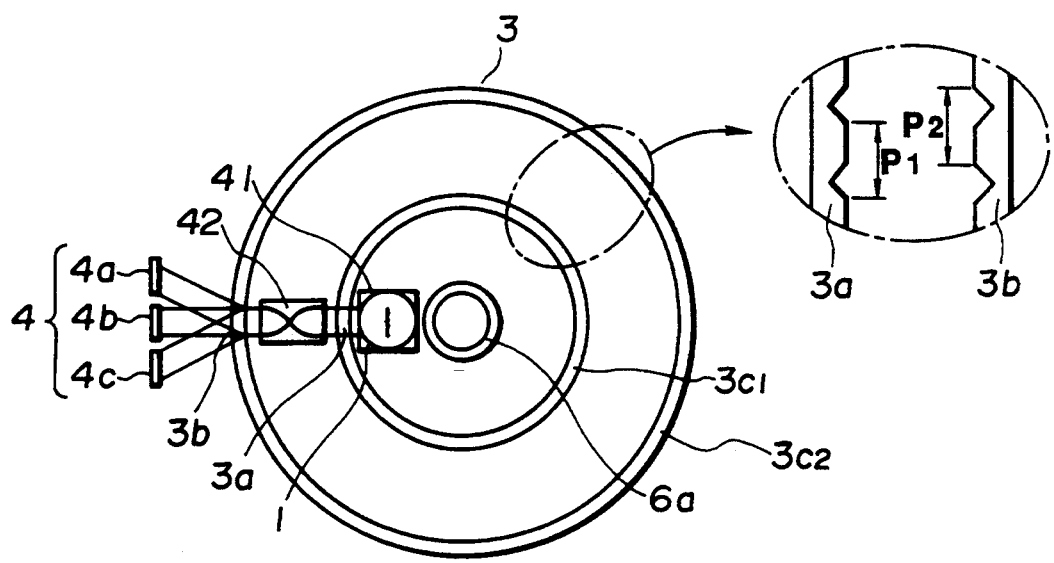
FIG. 12 is a plan view of the principal part of the device of the third embodiment.

FIG. 11 is a cross-sectional view of a principal part of a device according to a third embodiment of the present invention. FIG. 12 is a plan view of the part of the device of the second embodiment. In FIGS. 11 and 12, first optical scale 3a including a grating comprising a plurality of grooves with a constant period $P_1$ is formed on the outer circumferential surface of first cylindrical member $3c_1$.

The radius of second cylindrical member $3c_2$ is greater than the radius of first cylindrical member $3c_1$. Second optical scale 3b including a grating comprising a plurality of grooves with a constant period $P_2$ is formed one the inner circumferential surface of second cylindrical member $3c_2$. First and second optical scales 3a and 3b have a dual-ring structure and constitute optical scale 3. Optical scale 3 constitutes a part of rotating member 6. Light irradiating means LR including light source 1 and collimating lens 2 is arranged so that its optical axis is parallel to rotation shaft 6a of rotating member 6.

Reflecting member 41 guides the light beam from light irradiating means LR onto first optical scale 3a. Optical member 42 projects interference fringes formed by the light beams modulated (diffracted) by first optical scale 3a onto second optical scale 3b with a predetermined magnification. That is, optical member 42 projects the interference fringes so that the pitch of the fringes equals pitch $P_2$ of second optical scale 3b.

Optical member 42 is arranged so that the direction of movement of the interference fringes formed by the light beams modulated by first optical scale 3a caused by the rotation of optical scale 3 is reverse to the direction of movement of second optical scale 3b.

The length L of the optical path from first optical scale 3a to second optical scale 3b converted to a value in air is arranged to satisfy the following expression:

$$(N-1/5)P_1^2/\lambda \leq L \leq (N+1/5)P_1^2/\lambda,$$

where $P_1$ is the pitch of first optical scale 3a, $\lambda$ is the wavelength of the light beam from the light source of light irradiating means LR, and N is a natural number.

If the pitches of first and second optical scales 3a and 3b are represented by $P_1$ and $P_2$, respectively, the radii of first and second cylindrical members $3c_1$ and $3c_2$ are represented by $d_1$ and $d_2$, respectively, the number of pulse outputs of the present device is assumed to be 2n, the rotational angular velocity of rotating member 6 is represented by $\omega$, the magnification of the projection of first optical scale 3a on second optical scale 3b by optical member 42 is represented by $\beta$, and the focal length of optical member 42 is represented by f, the following expressions hold:

$$2d_2 \cdot \pi = n \cdot P_2,$$

$$d_1 \cdot \beta = d_2 \text{ and}$$

$$d_1 \cdot \beta = P_2 \text{ from } d_1 \cdot \omega \cdot \beta = d_2 \cdot \omega,$$

$$d_2 - d_1 = N \cdot P_1^2/\lambda,$$

$$f = (d_2 - d_1) \cdot \beta/(1+\beta)^2.$$

In the present embodiment, the respective units are arranged so as to satisfy the above-described expressions.

The light beams passing through second optical scale 3b travel toward photosensors 4a, 4b and 4c of light-sensing means 4. Output signals from light-sensing means 4 have a phase difference of 90°, and information regarding the rotation of optical scale 3 comprising pulses whose number is twice the number of grooves of the grating of second optical scale 3b is output.

According to the above-described configuration, the optical path from first optical scale 3a to second optical scale 3b does not pass through the space around the center of the rotation of rotation shaft 6a of rotating member 6 including the cylindrical optical scale 3. Hence, it becomes possible to mount the main body of the rotary encoder at an arbitrary position with respect to rotation shaft 6a. By mounting optical member 42 at arbitrary positions with respect to rotation shaft 6a, the influence of eccentricity is reduced.

Moreover, since the length L of the optical path can be made shorter than in the conventional configuration, the optical path can be arranged in a range of a small value of N, where the contrast of the interference image is maintained high. Hence, the present embodiment is advantageous for reducing deterioration of the output signals due to changes in the environment.

Figure 13:
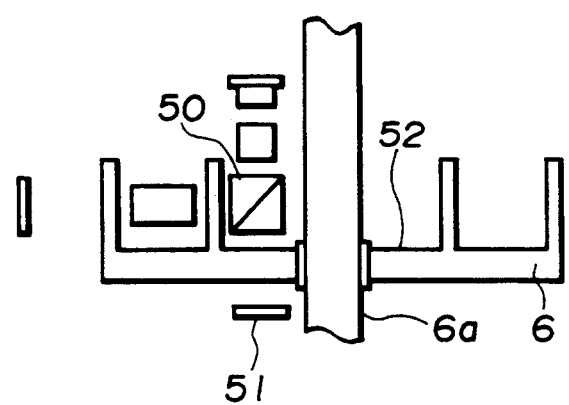
FIG. 13 is a cross-sectional view of a principal part of a device according to a fourth embodiment of the present invention.

FIG. 13 is a cross-sectional view of a principal part of a device according to a fourth embodiment of the present invention. FIG. 14 is a plan view of the principal part shown in FIG. 13.

The present embodiment differs from the third embodiment shown in FIG. 11 in that half-prism 50 is used in place of reflecting member 41, and slit-like opening 53 and two photosensors 51a and 51b (FIGS. 15(A) and 15(B)) are newly provided to obtain a signal representing the reference position of the rotation of rotating member 6. Other components are the same as those in the third embodiment.

That is, in the present embodiment, ringed light-blocking member 52a including slit-like opening 53 is provided on a portion of surface 52 of rotating member 6, and photosensors 51a and 51b having two light-sensing surfaces are provided below opening 53. As shown in FIGS. 15(A) and 15(B), by guiding a part of the light beam from light irradiating means LR to slit-like opening 53 via half-prism 50, slit-like light beam 54 scans photosensors 51a and 51b in accordance with the rotation of rotating member 6. The reference position of rotation when measuring the amount of the rotation of rotating member 6 is determined from the difference between output signals from the two photosensors 14a and 14b.

Figure 16:
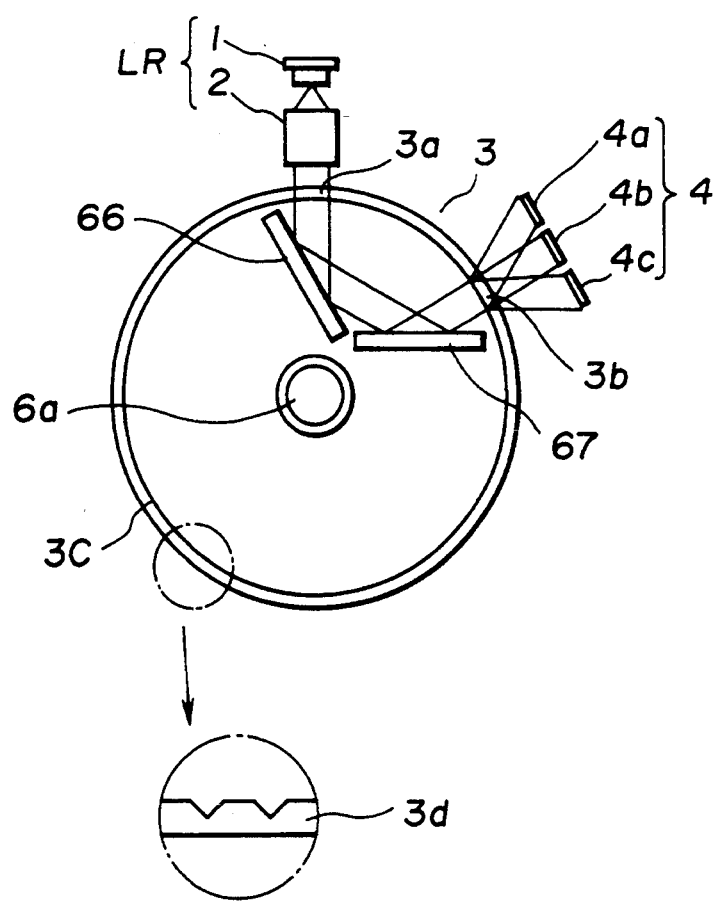
FIG. 16 is a plan view of a principal part of a device according to a fifth embodiment of the present invention.
Figure 17:
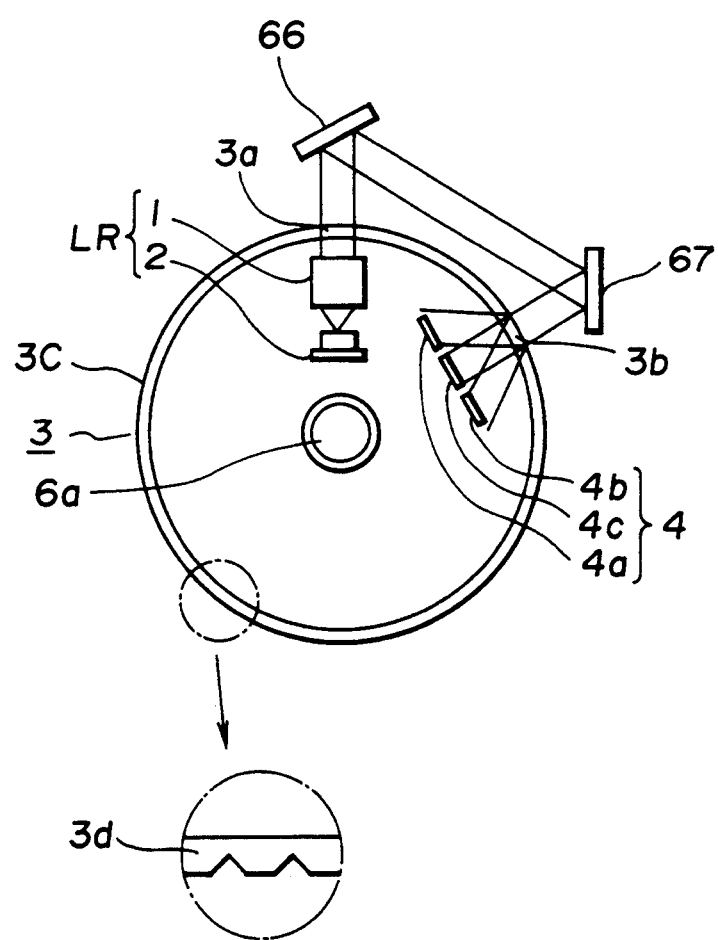
FIG. 17 is a plan view of a principal part of a device according to a sixth embodiment of the present invention.

FIGS. 16 and 17 are plan views of principal parts of devices according to fifth and sixth embodiments of the present invention, respectively. In the fifth embodiment shown in FIG. 16, light irradiating means LR and light sensing means 4 are provided at the outer circumference of cylindrical member 3C. The grating (with pitch P) of optical scale 3 is provided at the inner circumferential surface of cylindrical member 3C. In the sixth embodiment shown in FIG. 17, light irradiating means LR and light sensing means 4 are provided at regions away from rotation shaft 6a at the inner side of cylindrical member 3C. The grating (with pitch P) of optical scale 3 is provided at the outer circumferential surface of cylindrical member 3C.

The principle of detecting information regarding the rotation of rotating member 6 in the fifth and sixth embodiments is the same as in the first embodiment. That is, in the fifth and sixth embodiments, the light beam (with wavelength λ) from light irradiating means LR is projected onto first optical scale 3a, is projected onto second optical first optical scale 3a is projected onto second optical scale 3b after being reflected by mirrors 66 and 67. The three light beams modulated by second optical scale 3b are sensed by light sensing means 4 comprising three photosensors 4a, 4b and 4c. Information regarding the rotation of the rotating member 6 is detected using signals from light sensing means 4.

The length L of the optical path from first optical scale 3a to second optical scale 3b is expressed by the following expression:

$$(N-1/5)P^2/\lambda \leq L \leq (N+1/5)P^2/\lambda,$$

where P is the pitch of first optical scale 3a, λ is the wavelength of the light beam from the light source of light irradiating means LR, and N is a natural number.

Figure 18:
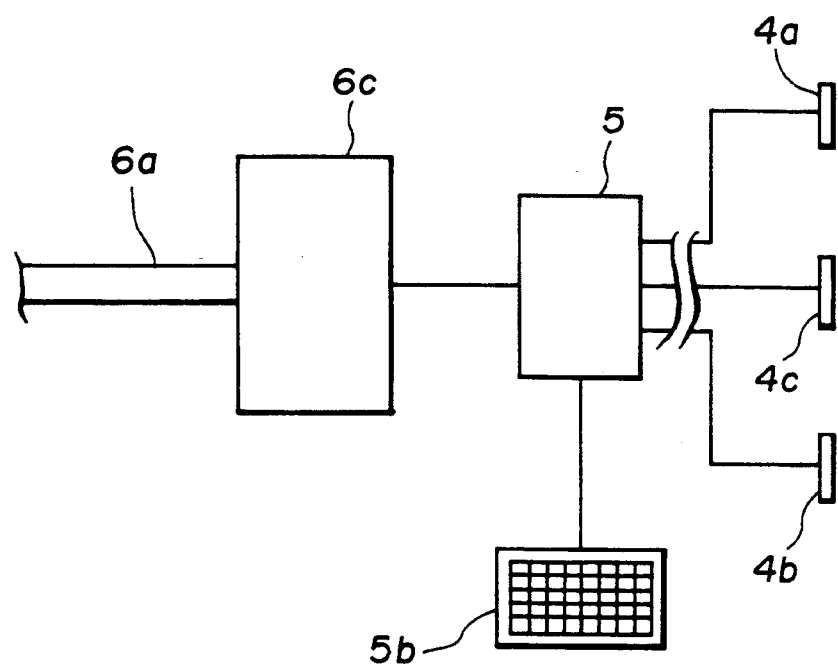
FIG. 18 is a diagram showing the schematic configuration of a driving system according to an embodiment of the present invention.

FIG. 18 is a diagram showing the schematic configuration of a driving system according to an embodiment of the present invention. Detection signals from photosensors 4a–4c obtained using any of the configurations of the above-described embodiments are input to signal processing circuit 5. Signal processing circuit 5 processes the detection signals from the respective photosensors to obtain information regarding the rotation of rotation shaft 6a (when photosensors 14a and 14b are provided, the reference position is simultaneously detected from output signals from these photosensors), and transmits a command signal to servo motor 6c in accordance with information input from input unit 5b. Servo motor 6c drives and controls the rotation of rotation shaft 6a in accordance with the command signal.

As described above, since the system is configured with a high degree of freedom in design in which the optical path from first optical scale 3a to second optical scale 3b does not pass through the center of the rotation of a rotating member, a very precise control of rotation free from eccentricity and the like can be performed.

According to the above-described embodiments, by appropriately selecting the configuration, arrangement and the like of light irradiating means, light sensing means and an optical scale, it is possible to provide a rotary encoder which utilizes Talbot's interference, whose main body can be provided at an arbitrary position with respect to the rotation shaft, so that a light beam does not pass through the center of the shaft while reducing the size of the entire device.

Except as otherwise disclosed herein, the various components shown in outline or block form in the Figures are individually well known, and their internal construction and operation are not critical either to the making or using of this invention or to a description of the best mode of the invention.

While the present invention has been described with respect to what is presently considered to be the preferred embodiments, it is to be understood that the invention is not limited to the disclosed embodiments. To the contrary, the present invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A device for detecting relative rotation between first and second members, one of which is rotated about an axis of rotation relative to the other, said device comprising:

a scale fixed relative to the first member, said scale being provided along the direction of relative rotation between the first and second members;

a light source provided on the second member for generating light beams;

a detection system provided on the second member for receiving at least one of the light beams emitted from said light source and passing through said scale, to detect the relative rotation between the first and second members; and a light guiding system for projecting the light beams from said light source onto a first position of said scale, and for forming and projecting a Fourier image of the first position on a second position of said scale using interference between at least first-order diffracted light and 0-order light generated from the first position, light beams from the second position being sensed by said detection system, and said light guiding system being disposed so that the optical path from the first position to the second position for forming the Fourier image does not include the axis of the relative rotation between the first and second members.

2. A device according to claim 1, wherein said light guiding system is disposed so that the image of the first position is projected onto the second position, and wherein the direction of movement of the image of the first position caused by the relative movement between the first and second members is oppose to the direction of movement of the second position.

3. A device according to claim 1, wherein said light guiding system is disposed so as to sastisfy the following relationship:

$$(N-1/5)P^2/\lambda \leq L \leq (N+1/5)P^2/\lambda,$$

where L is the length of the optical path from the first position to the second position converted to a value in air, P is the pitch of gratings of said scale, $\lambda$ is the wavelength of the light beams from said light source and N is a natural number.

4. A device according to claim 1, wherein said scale is formed of a transparent material.

5. A device according to claim 1, wherein said scale comprises projections and recesses having inclined surfaces arranged along the direction of the relative rotation between the first and second members.

6. A device according to claim 1, wherein said first and second positions are substantially the same position.

7. A device according to claim 1, further comprising a system for receiving the light beams from said light source and for detecting a relative reference positional relationship between the first and second members.

8. A device for detecting relative rotation between first and second members, one of which is rotated about an axis of rotation relative to the other, said device comprising:

two scales fixed relative to the first member, said scales being provided along the direction of relative rotation between the first and second members, a light source provided on the second member for generating light beams;

a detection system provided on the second member for receiving at least one of the light beams emitted from said light source and passing through said scales, to detect the relative rotation between the first and second members; and a light guiding system for projecting the light beams from said light source onto a first position of one of said scales, and for forming and projecting a Fourier image of the first position onto a second position of one of said scales using interference between at least first-order diffracted light and 0-order light generated from the first position, light beams from the second position being sensed by said detection system, and said light guiding system being disposed so that the optical path from the first position to the second position for forming the Fourier image does not include the axis of relative rotation between the first and second members.

9. A device according to claim 8, wherein said light guiding system is disposed so that the image of the first position is projected onto the second position, and wherein the direction of movement of the image of the first position caused by the relative movement between the first and second members is opposite to the direction of movement of the second position.

10. A device according to claim 8, wherein said light guiding system is disposed so as to satisfy the following relationship:

$$(N-1/5)P^2/\lambda \leq L \leq (N+1/5)P^2/\lambda,$$

where L is the length of the optical path from the first position to the second position or the other scale converted to a value in air, P is the pitch of gratings of said scales, $\lambda$ is the wavelength of the light beams from said light source and N is a natural number.

11. A device according to claim 8, wherein said scales are formed of a transparent material.

12. A device according to claim 8, wherein said scales comprise projections and recesses having inclined surfaces arranged along the direction of the relative rotation between the first and second members.

13. A device according to claim 8, wherein said two scales comprise first and second scales, wherein said first scale is provided on a disk-like substrate whose center substantially equals the axis of relative rotation of the first and second members, said second scale is provided on a cylindrical substrate whose center substantially equals the axis of relative rotation of the first and second members, and said light guiding system projects the light beams from said light source onto said first scale substantially perpendicularly to the disk-like substrate, and deflects the light beams emanated from said first scale to be projected onto said second scale.

14. A device according to claim 8, wherein said two scales are provided on two cylindrical substrates having different diameters whose centers substantially equal the axis of relative rotation of the first and second members, and wherein said light guiding system is disposed so that an image of said first scale is formed on said second scale.

15. A device according to claim 8, further comprising a system for detecting a relative reference positional relationship between the first and second members by receiving the light beams from said light source.

16. A device for detecting relative rotation between first and second members, one of which is rotated about an axis of rotation relative to the other, using a scale fixed relative to the first member and provided along the direction of relative rotation between the first and second members, said device comprising;
- a light source provided on the second member for generating light beams;
- a detection system provided on the second member for receiving at least one of the light beams emitted from said light source and passing through said scale, to detect the relative rotation between the first and second members; and
- a light guiding system for projecting the light beams from said light source onto a first position of said scale, and for forming and projecting a Fourier image of the first position on a second position of said scale using interference between at least first-order diffracted light and 0-order light generated from the first position, light beams from the second position being sensed by said detection system, and said light guiding system being disposed so that the optical path from the first position to the second position for forming the Fourier image does not include the axis of the relative rotation between the first and second members.

17. A device according to claim 16, wherein said light guiding system is disposed so that the image of the first position is projected onto the second position, and the direction of movement of the image of the first position caused by the relative movement between the first and second members is oppose to the direction of movement of the second position.

18. A device according to claim 16, wherein said light guiding system is disposed so as to sastisfy the following relationship:

$$(N-1/5)P^2/\lambda \leq L \leq (N+1/5)P^2/\lambda,$$

where L is the length of the optical path from the first position to the second position converted to a value in air, P is the pitch of gratings of said scale, $\lambda$ is the wavelength of the light beams from said light source and N is a natural number.

19. A device according to claim 16, further comprising a system for receiving the light beams from said light source and for detecting a relative reference positional relationship between the first and second members.

20. A device for detecting relative rotation between first and second members, one of which is rotated about an axis of rotation relative to the other, using two scales fixed relative to the first member and provided along the direction of the relative rotation between the first and second members, said device comprising:
- a light source provided on the second member for generating light beams;
- a detection system provided on the second member for receiving at least one of the light beams emitted from said light source and passing through said scales, to detect the relative rotation between the first and second members; and
- a light guiding system for projecting the light beams from said light source onto a first position of one of said scales, and for forming and projecting a Fourier image of the first position onto a second position of one of said scales using interference between at least first-order diffracted light and 0-order light generated from the first position, light beams from the second position being sensed by said detection system, and said light guiding system being disposed so that the optical path from the first position to the second position for forming the Fourier image does not include the axis of relative rotation between the first and second members.

21. A device according to claim 20, wherein said light guiding system is disposed so that the image of the first position is projected onto the second position, and the direction of movement of the image of the first position caused by the relative movement between the first and second members is opposite to the direction of movement of the second position.

22. A device according to claim 20, wherein said light guiding system is disposed so as to sastisfy the following relationship:

$$(N-1/5)P^2/\lambda \leq L \leq (N+1/5)P^2/\lambda,$$

where L is the length of the optical path from the first position to the second position or the other scale converted to a value in air, P is the pitch of gratings of said scales, $\lambda$ is the wavelength of the light beams from said light source and N is a natural number.

23. A device according to claim 20, further comprising a system for receiving the light beams from said light source and for detecting a relative reference positional relationship between the first and second members.

24. A driving system for relatively rotating first and second members, said system comprising:
- a scale fixed relative to the first member, said scale being provided along the direction of relative rotation between the first and second members;
- a light source provided on the second member for generating light beams;
- a detection system provided on the second member for receiving at least one of the light beams emitted from said light source and passing through said scale, to detect the relative rotation between the first and second members and for generating a detecting output;
- a light guiding system for projecting the light beams from said light source onto a first position of said scale, and for forming and projecting a Fourier image of the first position on a second position of said scale using interference between at least first-order diffracted light and 0-order light generated from the first position, light beams from the second position being sensed by said detection system, and said light guiding system being disposed so that the optical path from the first position to the second position for forming the Fourier image does not include the axis of relative rotation between the first and second members;
- a driving unit for relatively rotating the first and second members; and
- a control system for controlling said driving unit in accordance with the detection output by said detection system.

25. A driving system for relatively rotating first and second members, said system comprising:
- two scales fixed relative to the first member, said scales being provided along the direction of the relative rotation between the first and second members;

a light source provided on the second member for generating light beams;

a detection system provided on the second member for receiving at least one of the light beams emitted from said light source and passing through said scales, to detect the relative rotation between the first and second members and for generating a detecting output;

a light guiding system for projecting the light beams from said light source onto a first position of one of said scales, and for forming and projecting a Fourier image of the first position on a second position of one of said scales using interference between at least first-order diffracted light and 0-order light generated from the first position, light beams from the second position being sensed by said detection system, and said light guiding system being disposed so that the optical path from the first position to the second position for forming the Fourier image does not include the axis of relative rotation between the first and second members;

a driving unit for relatively rotating the first and second members; and a control system for controlling said driving unit in accordance with the detection output by said detection system.

26. A device for detecting relative rotation between first and second members, one of which is rotated about an axis of rotation relative to the other, said device comprising:

a scale fixed relative to the first member, said scale being provided along a direction of relative rotation between the first and second members;

a light source provided on the second member for generating light beams;

a detection system provided on the second member for receiving at least one of the light beams emitted from said light source and passing through said scale, to detect the relative rotation between the first and second members; and a light guiding system for projecting the light beams from said light source onto a first position of said scale, and for forming and projecting an image of the first position onto a second position of said scale, light beams from the second position being sensed by said detection system, and said light guiding system being disposed so that the optical path from the first position to the second position for forming the image does not include the axis of the relative rotation between the first and second members, and wherein the direction of movement of the image of the first position caused by the relative movement between the first and second members is opposed to the direction of movement of the second position.

27. A device according to claim 26, wherein said scale is formed of a transparent material.

28. A device according to claim 26, wherein said scale comprises projections and recesses having inclined surfaces arranged along the direction of the relative rotation between the first and second members.

29. A device according to claim 26, wherein said first and second positions are substantially the same position.

30. A device according to claim 26, further comprising a system for receiving the light beams from said light source and for detecting a relative reference positional relationship between the first and second members.

31. A device for detecting relative rotation between first and second members, one of which is rotated about an axis of rotation relative to the other, said device comprising:

two scales fixed relative to the first member, said scales being provided along a direction of relative rotation between the first and second members;

a light source provided on the second member for generating light beams;

a detection system provided on the second member for receiving at least one of the light beams emitted from said light source and passing through said scales, to detect the relative rotation between the first and second members; and a light guiding system for projecting the light beams from said light source onto a first position of one of said scales, and for forming and projecting an image of the first position onto a second position of one of said scales, light beams from the second position being sensed by said detection system, and said light guiding system being disposed so that the optical path from the first position to the second position for forming the image does not include the axis of the relative rotation between the first and second members, and wherein the direction of movement of the image of the first position caused by the relative movement between the first and second members is opposed to the direction of movement of the second position.

32. A device according to claim 31, wherein said scales are formed of a transparent material.

33. A device according to claim 31, wherein said scales comprise projections and recesses having inclined surfaces arranged along the direction of the relative rotation between the first and second members.

34. A device according to claim 31, wherein said two scales comprise first and second scales, and wherein said first scale is provided on a disk-like substrate whose center substantially equals the axis of relative rotation of the first and second members, said second scale is provided on a cylindrical substrate whose center substantially equals the axis of relative rotation of the first and second members, and said light guiding system projects the light beams from said light source onto said first scale substantially perpendicularly to the disk-like substrate, and deflects the light beams emanated from said first scale to be projected onto said second scale.

35. A device according to claim 31, wherein said two scales are provided on two cylindrical substrates having different diameters whose centers substantially equal the axis of relative rotation of the first and second members, and wherein said light guiding system is disposed so that an image of said first scale is formed on said second scale.

36. A device according to claim 31, further comprising a system for detecting a relative reference positional relationship between the first and second members by receiving the light beams from said light source.

37. A device for detecting relative rotation between first and second members, one of which is rotated about an axis of rotation relative to the other, using a scale fixed relative to the first member and provided along a direction of relative rotation between the first and second members, said device comprising:

a light source provided on the second member for generating light beams;

a detection system provided on the second member for receiving at least one of the light beams emitted from said light source and passing through said scale, to detect the relative rotation between the first and second members; and a light guiding system for projecting the light beams from said light source onto a first position of said scale, and for forming and projecting an image of the first position onto a second position of said scale, light beams from the second position being sensed by said detection system, and said light guiding system being disposed so that the optical path from the first position to the second position for forming the image does not include the axis of the relative rotation between the first and second members, and wherein the direction of movement of the image of the first position caused by the relative movement between the first and second members is opposed to the direction of movement of the second position.

38. A device according to claim 37, further comprising a system for receiving the light beams from said light source and for detecting a relative reference positional relationship between the first and second members.

39. A device for detecting relative rotation between first and second members, one of which is rotated about an axis of rotation relative to the other, using two scales fixed relative to the first member and provided along a direction of the relative rotation between the first and second members, said device comprising:

a light source provided on the second member for generating light beams;

a detection system on the second member for receiving at least one of the light beams emitted from said light source and passing through said scales, to detect the relative rotation between the first and second members; and a light guiding system for projecting the light beams from said light source onto a first position of one of said scales, and for forming and projecting an image of the first position onto a second position of one of said scales, light beams from the second position being sensed by said detection system, and said light guiding system being disposed so that the optical path from the first position to the second position for forming the image does not include the axis of the relative rotation between the first and second members, and wherein the direction of movement of the image of the first position caused by the relative movement between the first and second members is opposed to the direction of movement of the second position.

40. A device according to claim 39, further comprising a system for receiving the light beams from said light source and for detecting a relative reference positional relationship between the first and second members.

41. A driving system for relatively rotating first and second members, said system comprising:

a scale fixed relative to the first member, said scale being provided along a direction of relative rotation between the first and second members;

a light source provided on the second member for generating light beams;

a detection system provided on the second member for receiving at least one of the light beams emitted from said light source and passing through said scale, to detect the relative rotation between the first and second members and for generating a detecting output;

a light guiding system for projecting the light beams from said light source onto a first position of said scale, and for forming and projecting an image of the first position onto a second position of said scale, light beams from the second position being sensed by said detection system, and said light guiding system being disposed so that the optical path from the first position to the second position for forming the image does not include the axis of the relative rotation between the first and second members, and wherein the direction of movement of the image of the first position caused by the relative movement between the first and second members is opposed to the direction of movement of the second position;

a driving unit for relatively rotating the first and second members; and a control system for controlling said driving unit in accordance with the detection output by said detection system.

42. A driving system for relatively rotating first and second members, said system comprising:

two scales fixed relative to the first member, said scales being provided along a direction of the relative rotation between the first and second members;

a light source provided on the second member for generating light beams;

a detection system provided on the second member for receiving at least one of the light beams emitted from said light source and passing through said scales, to detect the relative rotation between the first and second members and for generating a detecting output;

a light guiding system for projecting the light beams from said light source onto a first position of one of said scales, and for forming and projecting an image of the first position onto a second position of one of said scales, light beams from the second position being sensed by said detection system, and said light guiding system being disposed so that the optical path from the first position to the second position for forming the image does not include the axis of the relative rotation between the first and second members, and wherein the direction of movement of the image of the first position caused by the relative movement between the first and second members is opposed to the direction of movement of the second position;

a driving unit for relatively rotating the first and second members; and a control system for controlling said driving unit in accordance with the detection output by said detection system.

* * * * *

UNITED STATES PATENT AND TRADEMARK OFFICE
CERTIFICATE OF CORRECTION

PATENT NO. : 5,369,271
DATED : November 29, 1994
INVENTOR(S) : MASARU NYUI

Page 1 of 2

It is certified that error appears in the above-indentified patent and that said Letters Patent is hereby corrected as shown below:

COLUMN 1:

Line 5, "continuation-in-part" should be deleted; and
    Line 6, "tion," should read --tion--.

COLUMN 5:

Line 2, "taht" should read --that--.

COLUMN 13:

Line 36, "oppose" should read --opposed--;
    Line 39, "sastisfy" should read --satisfy--; and
    Line 68, "bers," should read --bers;--.

COLUMN 14:

Line 35, "or the other scale" should be deleted.

UNITED STATES PATENT AND TRADEMARK OFFICE
CERTIFICATE OF CORRECTION

PATENT NO. : 5,369,271

DATED : November 29, 1994

INVENTOR(S) : MASARU NYUI

It is certified that error appears in the above-indentified patent and that said Letters Patent is hereby corrected as shown below:

COLUMN 15:

Line 31, "oppose" should read --opposed--; and
    Line 34, "sastisfy" should read --satisfy--.

COLUMN 16:

Line 15, "sastisfy" should read --satisfy--;
    Line 21, "or the other scale" should be deleted.

Signed and Sealed this

Thirteenth Day of June, 1995

Attest:

BRUCE LEHMAN

Attesting Officer     Commissioner of Patents and Trademarks